(12) United States Patent
Ling et al.

(10) Patent No.: US 6,652,942 B2
(45) Date of Patent: Nov. 25, 2003

(54) ASSEMBLY FOR A FLOWABLE MATERIAL CONTAINER

(75) Inventors: Michael T. K. Ling, Vernon Hills, IL (US); Ketan Shah, Gurnee, IL (US); Bill Hurst, Burlington, WI (US); Samuel Ding, Libertyville, IL (US)

(73) Assignee: Baxter International Inc., Deerfield, IL (US)

( * ) Notice: Subject to any disclaimer, the term of this patent is extended or adjusted under 35 U.S.C. 154(b) by 156 days.

(21) Appl. No.: 09/756,351

(22) Filed: Jan. 8, 2001

(65) Prior Publication Data

US 2002/0132077 A1 Sep. 19, 2002

(51) Int. Cl.$^7$ .................. B29D 22/00; B29D 23/00; B32B 1/08
(52) U.S. Cl. ............... 428/36.91; 428/35.2; 428/35.7; 428/36.9; 525/60; 525/61; 525/63; 525/66; 525/88; 525/92 B; 525/92 C; 525/92 F
(58) Field of Search ..................... 428/35.2, 35.7, 428/36.9, 36.91; 525/55, 63, 66, 60, 61, 88, 92 B, 92 C, 92 F

(56) References Cited

U.S. PATENT DOCUMENTS

| | | | |
|---|---|---|---|
| 2,324,237 A | 7/1943 | Reichel | 215/32 |
| 2,342,215 A | 2/1944 | Perelson | 215/38 |
| 2,562,389 A | 7/1951 | Piazze | 229/62 |
| 2,808,829 A | 10/1957 | Butler | 128/272 |
| 2,894,510 A | 7/1959 | Bellamy | 128/272 |
| 2,940,444 A | 6/1960 | Beall | 128/214 |
| 3,030,952 A | 4/1962 | Elder | 128/214 |
| 3,161,310 A | 12/1964 | Barton et al. | 215/1 |
| 3,442,737 A | 5/1969 | Reed et al. | 156/158 |
| 3,514,359 A | 5/1970 | Frese | 156/308 |
| 3,589,422 A | 6/1971 | Bellamy et al. | 150/1 |
| 3,642,047 A | 2/1972 | Waage | 150/8 |
| 3,746,001 A | 7/1973 | Ralston, Jr. | 128/214 |
| 3,769,136 A | 10/1973 | Ospelt | 156/308 |
| 3,788,374 A | 1/1974 | Saijo | 150/1 |
| 3,861,973 A | 1/1975 | Koch | 156/143 |
| 3,866,631 A | 2/1975 | Chudgar | 138/125 |
| 3,869,338 A | 3/1975 | Kavesh | 161/165 |
| 3,900,640 A | 8/1975 | Vecchiotti | 428/36 |
| 3,911,051 A | 10/1975 | Schouten et al. | 260/876 B |
| 3,928,110 A | 12/1975 | Arconti et al. | 156/308 |
| 3,951,148 A | 4/1976 | Herb | 128/272 |
| 3,963,026 A | 6/1976 | Herb | 128/272 |
| 3,978,859 A | 9/1976 | Goodenough et al. | 128/272 |
| 3,986,507 A | 10/1976 | Watt | 128/214 D |
| 3,991,912 A | 11/1976 | Soto | 222/89 |
| 4,049,034 A | 9/1977 | Vcelka et al. | 150/8 |
| 4,137,117 A | 1/1979 | Jones | 156/294 |
| 4,187,893 A | 2/1980 | Bujan | 150/8 |
| 4,201,208 A | 5/1980 | Cambio, Jr. | 128/214.2 |
| 4,240,481 A | 12/1980 | Bayham | 150/8 |
| 4,303,067 A | 12/1981 | Connolly et al. | 128/272 |
| 4,307,766 A | 12/1981 | Tanokura | 150/8 |
| 4,327,726 A | 5/1982 | Kwong et al. | 128/272 |
| 4,340,049 A | 7/1982 | Munsch | 128/214 R |
| 4,362,158 A | 12/1982 | Lena | 128/272 |
| 4,386,622 A | 6/1983 | Munsch | 137/1 |
| 4,393,909 A | 7/1983 | Pearson | 150/8 |
| 4,412,573 A | 11/1983 | Zdeb | 604/415 |
| 4,441,538 A | 4/1984 | Larkin et al. | 604/145 |
| 4,465,488 A | 8/1984 | Richmond et al. | 604/414 |
| 4,479,989 A | 10/1984 | Mahal | 428/35 |
| 4,484,916 A | 11/1984 | McPhee | 604/256 |
| 4,516,977 A | 5/1985 | Herbert | 604/415 |
| 4,523,691 A | 6/1985 | Larkin et al. | 220/266 |
| 4,524,880 A | 6/1985 | Danielson et al. | 220/288 |
| 4,547,900 A | 10/1985 | Larkin et al. | 383/5 |
| 4,551,138 A | 11/1985 | Shinohara | 604/262 |
| 4,567,999 A | 2/1986 | Hjertman et al. | 222/83 |
| 4,576,602 A | 3/1986 | Levin et al. | 604/408 |
| 4,578,074 A | 3/1986 | van Leerdam | 604/408 |
| 4,586,928 A | 5/1986 | Barnes et al. | 604/408 |
| 4,588,396 A | 5/1986 | Stroebel et al. | 604/246 |
| 4,596,573 A | 6/1986 | Donnan et al. | 604/415 |
| 4,607,671 A | 8/1986 | Aalto et al. | 141/329 |
| 4,610,374 A | 9/1986 | Buehler | 222/83 |
| 4,632,673 A | 12/1986 | Tiitola et al. | 604/415 |
| 4,636,204 A | 1/1987 | Christopherson et al. | 604/283 |
| 4,666,549 A | 5/1987 | Boultinghouse | 156/308.6 |
| 4,676,775 A | 6/1987 | Zolnierczyk et al. | 604/28 |
| 4,723,956 A | 2/1988 | Schnell et al. | 604/414 |

(List continued on next page.)

Primary Examiner—James J. Seidleck
Assistant Examiner—Travis B Ribar
(74) Attorney, Agent, or Firm—Mark J. Buonaiuto; Joseph A. Fuchs

(57) ABSTRACT

The present invention provides a multiple layered non-PVC containing tubing structure. The tubing structure has a first and a second layer. The first layer is of a polymer blend of: (a) from about 30% to about 50% by weight of the first layer a first polyolefin selected from the group consisting of a first propylene containing polymer, (b) from about 0 to about 50% by weight of the first layer a second polyolefin of an α-olefin containing polymer; (c) from about 0% to about 40% by weight of the first layer a radio frequency susceptible polymer selected from the group consisting of polyamides, ethylene acrylic acid copolymers, ethylene methacrylic acid copolymers, polyimides, polyurethanes, polyesters, polyureas, ethylene vinyl acetate copolymers with a vinyl acetate comonomer content from 18–50% by weight of the copolymer, ethylene methyl acrylate copolymers with methyl acrylate comonomer content from 180%–40% by weight of the copolymer, ethylene vinyl alcohol with vinyl alcohol comonomer content from 15%–70% by mole percent of the copolymer; (d) from about 5% to about 40% of a first thermoplastic elastomer. The second layer is of a non-PVC containing material and is a multiple component polymer blend of from about 25% to about 55% by weight of a second thermoplastic elastomer, 20% to about 45% of a polyester polyether block copolymer, 0–15% ethylene copolymerized with vinyl lower alkyl esters, 0–10% of a second propylene containing polymer and from 0%–35% acrylonitrile butadiene styrene block copolymer.

26 Claims, 1 Drawing Sheet

U.S. PATENT DOCUMENTS

| | | | |
|---|---|---|---|
| 4,785,859 A | 11/1988 | Gustavsson et al. | 141/313 |
| 4,808,179 A | 2/1989 | Lindstam | 604/408 |
| 4,838,875 A | 6/1989 | Somor | 604/262 |
| 4,857,129 A | 8/1989 | Jensen et al. | 156/273.7 |
| 4,869,384 A | 9/1989 | Ogle, II | 215/247 |
| 4,917,684 A | 4/1990 | Yasumura | 604/468 |
| 4,950,347 A | 8/1990 | Futagawa | 156/272.4 |
| 4,969,883 A | 11/1990 | Gilbert et al. | 604/414 |
| 5,071,413 A | 12/1991 | Utterberg | 604/283 |
| 5,084,042 A | 1/1992 | McPhee | 604/415 |
| 5,088,995 A | 2/1992 | Packard et al. | 604/415 |
| 5,114,768 A | 5/1992 | Swedberg | 428/36.91 |
| 5,122,126 A | 6/1992 | Sakakiyama | 604/415 |
| 5,125,919 A | 6/1992 | Miller et al. | 604/408 |
| 5,137,527 A | 8/1992 | Miller et al. | 604/415 |
| 5,167,816 A | 12/1992 | Kruger et al. | 210/257.2 |
| 5,188,628 A | 2/1993 | Rani et al. | 604/405 |
| 5,222,950 A | 6/1993 | Eisenberg | 604/408 |
| 5,251,982 A | 10/1993 | Stenstrom et al. | 383/209 |
| 5,259,843 A | 11/1993 | Watanabe et al. | 604/256 |
| 5,259,894 A | 11/1993 | Sampson | 156/64 |
| 5,297,599 A | 3/1994 | Bucheli | 141/329 |
| 5,303,751 A | 4/1994 | Slater et al. | 141/329 |
| 5,308,347 A | 5/1994 | Sunago et al. | 604/403 |
| 5,330,464 A | 7/1994 | Mathias et al. | 604/415 |
| 5,334,180 A | 8/1994 | Adolf et al. | 604/411 |
| 5,336,351 A | 8/1994 | Meyers | 156/158 |
| 5,342,345 A | 8/1994 | Spencer | 604/408 |
| 5,342,346 A | 8/1994 | Honda et al. | 604/413 |
| 5,352,210 A | 10/1994 | Marrucchi | 604/180 |
| 5,391,150 A | 2/1995 | Richmond | 604/111 |
| 5,395,365 A | 3/1995 | Weiler et al. | 604/415 |
| 5,416,142 A | 5/1995 | Bush et al. | 524/113 |
| 5,423,794 A | 6/1995 | Adolf et al. | 604/415 |
| 5,458,593 A | 10/1995 | Macabasco et al. | 604/403 |
| 5,496,291 A * | 3/1996 | Spencer | 604/523 |
| 5,514,123 A | 5/1996 | Adolf et al. | 604/411 |
| 5,520,641 A | 5/1996 | Behnke et al. | 604/86 |
| 5,540,674 A | 7/1996 | Karas et al. | 604/415 |
| 5,573,527 A | 11/1996 | Macabasco et al. | 604/410 |
| 5,584,825 A | 12/1996 | Smith | 604/319 |
| 5,662,642 A | 9/1997 | Isono et al. | 604/403 |
| 5,672,162 A | 9/1997 | Smith | 604/319 |
| 5,728,087 A | 3/1998 | Niedospial, Jr. | 604/408 |
| 5,733,619 A * | 3/1998 | Patel et al. | 428/36.91 |
| 5,772,652 A | 6/1998 | Zielinski | 604/411 |
| 5,772,880 A | 6/1998 | Lynn et al. | 210/435 |
| 5,776,116 A | 7/1998 | Lopez et al. | 604/283 |
| 5,779,832 A | 7/1998 | Kocher | 156/73.1 |
| 5,810,398 A | 9/1998 | Matkovich | 285/3 |
| 5,814,384 A | 9/1998 | Akkapeddi et al. | 428/35.7 |
| 5,849,843 A * | 12/1998 | Laurin et al. | 525/66 |
| 5,976,300 A * | 11/1999 | Buchanan et al. | 156/273.7 |
| 5,998,019 A | 12/1999 | Rosenbaum et al. | 428/345 |
| 6,019,750 A | 2/2000 | Fowles et al. | 604/403 |
| 6,019,751 A | 2/2000 | Gabbard et al. | 604/408 |
| 6,022,344 A | 2/2000 | Meijer et al. | 604/533 |
| 6,083,194 A | 7/2000 | Lopez | 604/28 |
| 6,127,009 A | 10/2000 | Strassmann | 428/35.2 |
| 6,132,413 A | 10/2000 | Mathias et al. | 604/403 |
| 6,146,362 A | 11/2000 | Turnbull et al. | 604/256 |
| 6,179,821 B1 | 1/2001 | Caspary et al. | 604/403 |

\* cited by examiner

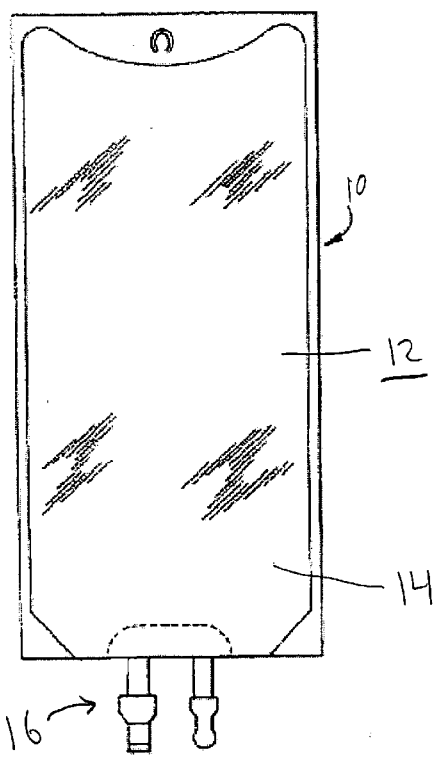
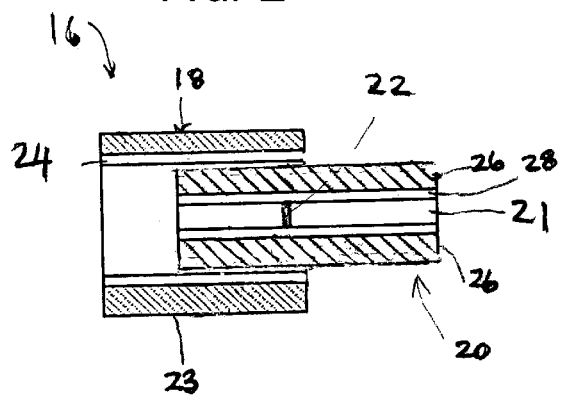
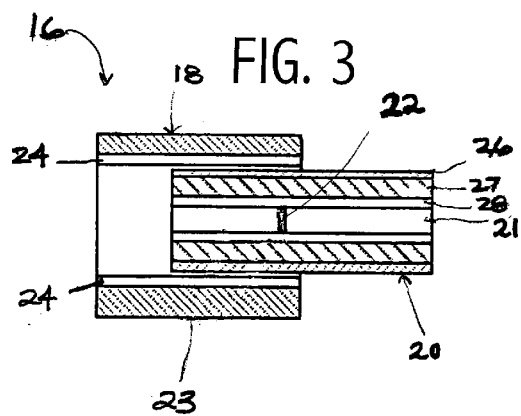

ASSEMBLY FOR A FLOWABLE MATERIAL CONTAINER

TECHNICAL FIELD

The present invention relates generally to closures for flowable material containers and more particularly closure assemblies for medical fluid containers.

BACKGROUND OF THE INVENTION

It is common medical practice to provide fluids to a patient either intravenously or enterally as a method of treating a patient for various medical conditions. Frequently, the fluids to be administered to a patient are contained in a flexible container. One method of forming a flexible container is to seal two sheets of flexible material about the periphery of the sheets to create a fluid tight chamber. A port tube assembly is frequently placed between the sheets during the sealing process to create a communication between the fluid chamber and the exterior of the container to provide a means of introducing fluid into or dispensing fluid from the container. The port tube assembly typically includes an outer port tube that attaches to the sidewalls of the container and a second tube called a membrane tube that is disposed coaxially within the port tube. The membrane tube has a membrane or diaphragm that seals the port tube assembly. The membrane is typically punctured by a spike of a fluid administration set to place the contents of the container in fluid communication with a patient.

Port tubes and membrane tubes are fabricated from monolayer or multiple layered materials. The port tube typically has an inner layer of polyvinyl chloride and the membrane tube has an outer layer of PVC. To assemble the port tube assembly, the membrane tube is dipped in cyclohexanone or other suitable solvent and is inserted in a telescoping fashion into the port tube. The solvent melts the PVC of both the port tube and the membrane tube thereby hermetically sealing the membrane tube to the port tube.

There has been a great effort by many manufacturers of medical articles to replace PVC materials with non-PVC containing materials. Flexible PVC containers include low molecular weight additives know as plasticizers which may exude into the solutions contained in the container. U.S. Pat. Nos. 5,998,019 and 5,849,843, which are incorporated herein by reference and made a part hereof, disclose replacing PVC materials in medical fluid containers with non-PVC containing materials.

U.S. Pat. No. 5,356,709, assigned to the same assignee of the present invention, discloses a non-PVC coextruded medical grade port tubing. The tubing has an outer layer of a blend of polypropylene and SEBS a tie layer and a core layer of a blend of polyamide and EVA.

U.S. Pat. No. 5,533,992, assigned to the same assignee of the present invention, discloses a non-PVC material for fabricating medical tubings and medical containers. Polymer blends for fabricating medical tubing disclosed in the '992 patent include polyurethane blended with one or more of the following: EVA, SEBS, PCCE, and thermoplastic copolyester elastomers.

The present assignee is presently marketing a container for storing, shipping and delivering of medical fluids. A port tube provided with the container has an outer layer of a polymer blend by weight of the following four components: 40% polypropylene, 40% ultra low density polyethylene, 10% dimer fatty acid polymamide and 10% styrene-ethylene-butene-styrene block copolymer with maleic anhydride functionality. The port tubing has an inner layer of PVC for solvent bonding to a membrane tube of PVC material.

SUMMARY OF THE INVENTION

The present invention provides a non-PVC port tube, a non-PVC membrane tube and a non-PVC closure assembly for use in flowable material containers such as medical and food containers.

The closure assembly includes a port tube and a membrane tube coaxially mounted therein. The port tube has a first layer and a second layer disposed coaxially within the first layer. In a preferred form of the invention the first layer is capable of being sealed to sidewalls of a flowable materials container and more preferably using radio frequency sealing techniques. In a preferred form of the invention the first layer is a polymer blend of four components. The first component is present in an amount by weight of from about 25% to about 50% by weight of the first layer. The first component is a first polyolefin of a propylene containing polymer. The second component is present in an amount by weight of from about 0 to about 50% by weight of the first layer and is a second polyolefin. The second polyolefin is an α-olefin containing polymer and in a preferred form of the invention is an ethylene and α-olefin copolymer. The third component is present in an amount by weight of from about 0% to about 40% by weight of the first layer and is a radio frequency ("RF") susceptible. The RF polymer is selected from the group consisting of polyamides, ethylene acrylic acid copolymers, ethylene methacrylic acid copolymers, polyimides, polyurethanes, polyesters, polyureas, ethylene vinyl acetate copolymers with a vinyl acetate comonomer content from 18–50% by weight of the copolymer, ethylene methyl acrylate copolymers with methyl acrylate comonomer content from 18%–40% by weight of the copolymer, ethylene vinyl alcohol with vinyl alcohol comonomer content from 15%–70% by mole percent of the copolymer; and (4) from about 0% to about 40% of a first thermoplastic elastomer. Particularly suitable blends are disclosed in greater detail in U.S. Pat. No. 5,686,527 which is incorporated herein by reference and made a part hereof.

The second layer of the port tube is disposed coaxially within the first layer and is a non-PVC material that is reactive with an organic solvent. More preferably the second layer is reactive with an aromatic solvent including cyclohexanone, toluene, tetrahydofuran, cumene, xylenes, diethyl benzene decalin, tetralin and amyl benzene to name a few. In a preferred form of the invention the second layer is a blend of from about 25% to about 55% by weight of a thermoplastic elastomer, 20% to about 45% of a polyester polyether block copolymer, 0%–15% ethylene vinyl acetate, 0–10% of a propylene containing polymer and from 0%–35% of a polymer selected from the group consisting of acrylonitrile butadiene styrene block copolymer, styrene ethylene butene copolymer, styrene acrylonitrile copolymer and cyclic olefin or bridged polycylic olefin containing polymers.

In one preferred form of the invention, the membrane tube has two layers an outer layer and an inner layer disposed coaxially within the outer layer. The outer layer is reactive to organic solvents and more preferably the aromatic solvents identified above. The outer layer of the membrane tube is of a material selected from the same materials as the second layer of the port tube. Likewise, the inner layer of the membrane tube is capable of being sealed using radio frequency sealing techniques and is selected from the same materials as set forth above for the first layer of the port tube.

The present invention also provides for membrane tubings having more than two layers, such as three layers or more. In a preferred embodiment a core layer of a thermoplastic elastomer such as a styrene and diene type copolymer such as Kraton KG 2705 sold by Shell Chemical Co.

BRIEF DESCRIPTION OF THE DRAWINGS

FIG. 1 is a cross-sectional view of a flexible material container and a port closure assembly.

FIG. 2 is a cross-sectional view of a closure assembly having a membrane tube and two-layered port tube.

FIG. 3 is a cross-sectional view of a closure assembly having a membrane tube and a three-layered port tube.

DETAILED DESCRIPTION

The present invention is susceptible of embodiments in many different forms. Preferred embodiments of the invention are disclosed with the understanding that the present disclosure is to be considered as exemplifications of the principles of the invention and are not intended to limit the broad aspects of the invention to the embodiments illustrated.

FIG. 1 shows a flowable material container 10 having sidewalls 12 sealed along peripheral edges to define a chamber 14 therebetween. A closure assembly 16 provides access to the contents of the container. The container 10 is preferably fabricated from a non-PVC containing material. In a preferred form of the invention the sidewalls 12 are fabricated from a multiple component polymer alloy disclosed in detail in U.S. Pat. No. 5,686,527 which is incorporated herein by reference and made a part hereof. One particularly suitable polymer alloy is a blend of polypropylene, ultra-low density polyethylene, a dimer fatty acid polyamide and a styrene and hydrocarbon block copolymer. The container 10 shown in FIG. 1 is particularly suitable for medical applications such as storage and delivery of I.V. solutions, peritoneal dialysis solutions, pharmaceutical drugs and blood and blood components to name a few. It is contemplated that such a container can also be used to store food products or other consumable products.

What is meant by "flowable material" is a material that will flow by the force of gravity. Flowable materials therefore include both liquid items and powdered or granular items and the like.

FIG. 2 shows the closure assembly 16. The closure assembly 16 has a port tube 18 and a membrane tube 20 coaxially mounted therein. A fluid passageway 21 of the membrane tube 20 is sealed by a membrane 22 positioned at an intermediate portion of the membrane tube 20. For medical applications, the membrane 22 can be punctured by a spike of an infusion set to place the contents of the container into fluid communication with, for example, the vascular system of a patient being treated.

In a preferred form of the invention the port tube 18 is a multilayered structure and more preferably has a first layer 23 and a second layer 24. The first layer 23 should be of a non-PVC containing material that is capable of being sealed to the sidewalls 12 of the container 10, and preferably sealed using radio frequency sealing techniques. In a preferred form of the invention the first layer 23 is a polymer blend of: (a) from about 25% to about 50% by weight and more preferably from about 30% to about 40% by weight, of the first layer a first polyolefin selected from the group consisting of propylene containing polymers, (b) from about 0 to about 50% by weight, and more preferably from about 5–40% by weight, of the first layer a second polyolefin of an α-olefin containing polymer or copolymer and more preferably is an ethylene and α-olefin copolymer; (c) from about 0% to about 40% by weight, and more preferably from about 10% to about 40% by weight, of the first layer a radio frequency susceptible polymer selected from the group consisting of polyamides, ethylene acrylic acid copolymers, ethylene methacrylic acid copolymers, polyimides, polyurethanes, polyesters, polyureas, ethylene vinyl acetate copolymers with a vinyl acetate comonomer content from 18–50% by weight of the copolymer, ethylene methyl acrylate copolymers with methyl acrylate comonomer content from 18%–40% by weight of the copolymer, ethylene vinyl alcohol with vinyl alcohol comonomer content from 15%–70% by mole percent of the copolymer; and (d) from about 0% to about 40% by weight, and more preferably from 10% to about 40% by weight, of the first layer of a thermoplastic elastomer.

One particularly suitable blend for the port tube first layer is a four component blend having by weight the following components: from about 10% to about 40% and more preferably 30% of a dimer fatty acid polyamide, from about 0% to about 50% and more preferably from about 0% to about 10% of an ultra low density polyethylene, from about 25% to about 50% and more preferably from about 30% to about 40% of a polypropylene and from about 10% to about 40% and more preferably 30% styrene-ethylene-butene-styrene block copolymer with maleic anhydride functionality.

The second layer 24 of the port tube 18 is of a non-PVC containing material that is capable of being solvent bonded to the membrane tube 20. In a preferred form of the invention the second layer 24 is a multiple component blend of the following components by weight: from about 25% to about 55% and more preferably from 33%–52% of a thermoplastic elastomer, from about 20% to about 45% and more preferably from about 25% to about 42% of a polyester polyether block copolymer, from about 0% to about 15% and more preferably from about 5% to about 12% by weight of the second layer an ethylene copolymerized with vinyl lower alkyl esters and preferably vinyl acetate, from about 0% to about 10% by weight and more preferably from about 1% to about 5% by weight of the second layer of a propylene containing polymer and from about 0% to about 35% by weight of a polymer selected from the group consisting of acrylonitrile butadiene styrene (ABS) block copolymer, styrene ethylene butene copolymer, styrene acrylonitrile copolymer and cyclic olefin or bridged polycylic olefin containing polymers.

One particularly suitable blend of the second layer 24 of the port tube is a five-component blend having from about 33% to about 35% SEBS (Kraton 1660), from about 25% to about 29% polyester polyether block copolymers (Hytrel), from about 5% to about 9% EVA, from about 1% to about 3% polypropylene and from about 28% to about 32% ABS.

Another suitable blend of the second layer of the port tube is a four-component blend having from about 48% to about 52% SEBS, from about 36% to about 42% polyester polyether block copolymer, from about 8% to about 12% EVA and from about 1% to about 4% polypropylene.

As shown in the Figures, the first layer 23 has a thickness greater than the second layer 24. In a preferred form of the invention the first layer will have a thickness of from about 15 mils to about 40 mils and more preferably from about 20 mils to about 30 mils. The second layer 24 will have a thickness from about 2 mils to about 12 mils and more preferably from about 5 mils to about 10 mils.

The membrane tube 20 should be fabricated from a non-PVC containing material and should be capable of being bonded, preferably using solvent bonding techniques, to the port tube 18. In a preferred form of the invention the membrane tube 20 is a multilayered structure. The membrane tube 20 has an outer layer 26 and an inner layer 28. The outer layer 26 is of a material selected from the same materials as set forth for the second layer 24 of the port tube. Likewise the inner layer 28 of the membrane tube 20 is selected from the same materials as the first layer 22 of the port tube 18.

A particularly suitable inner layer of the membrane tube is a four-component blend by weight of the inner layer 28 that slightly varies from the most preferred first layer of the port tube. The components are by weight of the inner layer 28 as follows: 40% polypropylene, 40% ultra-low density polyethylene, 10% polyamide and 10% SEBS. It should be understood, however, that the inner layer 28 of the membrane tube could also be selected from the same components and weight percentage ranges as set forth above for the first layer of the port tube.

In a preferred form of the invention the outer layer of the membrane tube should have a thickness from about 15 mils to about 35 mils and more preferably from about 20 mils to about 30 mils. The inner layer of the membrane tube should have a thickness from about 2 mils to about 12 mils and more preferably from about 5 mils to about 10mils.

FIG. 3 shows an alternate embodiment of the membrane tube having three layers. In addition to the outer layer 26 and inner layer 28 shown in FIG. 2, FIG. 3 shows an intermediate layer 27 interposed therebetween. The intermediate layer 27 preferably is a thermoplastic elastomer and more preferably an oil modified styrene-ethylene-butene-styrene block copolymer sold by the Shell Chemical Company under the product designation KRATON G2705. The intermediate layer 27 can also be a blend of from about 99% to about 70% of a thermoplastic elastomer and from about 1% to about 30% of a propylene containing polymer.

Suitable propylene containing polymers include homopolymers, copolymers and terpolymers of propylene. Suitable comonomers are one or more α-olefins having from 2 to 17 carbons and most preferably is ethylene in an amount by weight from about 1% to about 8% by weight of the copolymer. Suitable propylene containing polymers include those sold by Solvay under the tradename FORTILENE and include from about 1.0% to about 4.0% ethylene by weight of the copolymer.

Suitable α-olefin containing polymers include homopolymers, copolymers and interpolymers of α-olefins having from 2 to 17 carbons. Suitable ethylene α-olefin copolymers have a density, as measured by ASTM D-792, of less than about 0.915 g/cc and are commonly referred to as very low density polyethylene (VLDPE), linear low density polyethylene (LLDPE), ultra low density polyethylene (ULDPE) and the like. In a preferred form of the invention, the ethylene and α-olefin copolymers are obtained using single site catalysts. Suitable catalyst systems, among others, are those disclosed in U.S. Pat. Nos. 5,783,638 and 5,272,236. Suitable ethylene and α-olefin copolymers include those sold by Dow Chemical Company under the AFFINITY tradename, Dupont-Dow under the ENGAGE tradename, Exxon under the EXACT tradename and Phillips Chemical Company under the tradename MARLEX.

Suitable polyamides include those selected from a group consisting of: aliphatic polyamides resulting from the condensation reaction of di-amines having a carbon number within a range of 2–13, aliphatic polyamides resulting from a condensation reaction of di-acids having a carbon number within a range of 2–13, polyamides resulting from the condensation reaction of dimer fatty acids, and amide containing copolymers. Polyamides resulting from a ring opening operation of a cyclic amides such as a ε-caprolactam is also suitable. In a preferred form of the invention the polyamide is a dimer fatty acid polyamide sold by Henkel under the tradename MACROMELT.

Suitable thermoplastic elastomers of the present invention include styrene and hydrocarbon copolymers, and EPDM. The styrene can be substituted or unsubstituted styrene. The styrene and hydrocarbon copolymers can be a block copolymer including di-block, tri-block, star block, it can also be a random copolymer and other types of styrene and hydrocarbon copolymers that are known by those skilled in the art. The styrene and hydrocarbon copolymers can also contain various types of the above-identified styrene and hydrocarbon copolymers.

The styrene and hydrocarbon copolymers can be functionalized by carboxylic acid groups, anhydrides of carboxylic acids, esters of carboxylic acids, epoxy groups and carbon monoxide. In a preferred form of the invention the thermoplastic elastomer of the first layer 22 of the port tube 18 and the inner layer 28 of the membrane tube 20 is an SEBS di-block copolymer SEBS copolymer. Such a copolymer is sold by Shell Chemical Company under the tradename KRATON® FG1924X.

The preferred thermoplastic elastomer of the second layer 24 of the port tube 18 and the outer layer 26 of the membrane tube 20 is an SEBS copolymer. Such a copolymer is sold by, for example, Shell Chemical Company under the tradename KRATON® 1660.

Suitable polyester polyether block copolymers have are sold by Dupont under the tradename HYYTREL and particularly HYTREL 4056

The term "vinyl lower alkyl esters" include those having the formula set fort in Diagram 1:

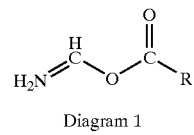

Diagram 1

The R in Diagram 1 refers to alkanes having from 1 to 17 carbons. Thus, the term "vinyl lower alkyl esters" includes but is not limited to vinyl methanoate, vinyl acetate, vinyl propionate, vinyl butyrate and the like. In a preferred form of the invention the ethylene and vinyl lower alkyl ester of the second layer 24 of the port tube 18 and the outer layer 26 of the membrane tube 20 is an ethylene and vinyl acetate copolymer having from about 12% to about 40% vinyl acetate comonomer by weight of the copolymer. Suitable ethylene and vinyl acetate copolymers are sold by Quantum under the product designations UE634 and UE697.

Suitable ABS copolymers include acrylonitrile butadiene styrene triblock copolymers.

Suitable cyclic olefin or bridged polycyclic hydrocarbon containing polymers and blends thereof can be found in copending patent application Ser. No. 09/393,051,and in U.S. Pat. Nos. 5,218,049, 5,854,349, 5,863,986, 5,795,945, 5,792,824; EP 0 291,208, EP 0 283,164, EP 0 497,567 which are incorporated in their entirety herein by reference and made a part hereof. In a preferred form of the invention these homopolymers, copolymers and polymer blends will have a glass transition temperature of greater than 50° C., more preferably from about 70° C. to about 180° C., a density greater than 0.910 g/cc and more preferably from 0.910g/cc to about 1.3 g/cc and most preferably from 0.980 g/cc to about 1.3 g/cc and have from at least about 20 mole % of a cyclic aliphatic or a bridged polycyclic in the backbone of the polymer more preferably from about 30–65 mole % and most preferably from about 30–60 mole %.

In a preferred form of the invention, suitable cyclic olefin monomers are monocyclic compounds having from 5 to about 10 carbons in the ring. The cyclic olefins can selected from the group consisting of substituted and unsubstituted cyclopentene, cyclopentadiene, cyclohexene, cyclohexadiene, cycloheptene, cycloheptadiene, cyclooctene, cyclooctadiene. Suitable substituents include lower alkyl, acrylate derivatives and the like.

In a preferred form of the invention, suitable bridged polycyclic hydrocarbon monomers have two or more rings and more preferably contain at least 7 carbons. The rings can be substituted or unsubstituted. Suitable substitutes include lower alkyl, aryl, aralkyl, vinyl, allyloxy, (meth) acryloxy and the like. The bridged polycyclic hydrocarbons are selected from the group consisting of those disclosed in the above incorporated patents and patent applications. Suitable bridged polycyclic hydrocarbon containing polymers are sold by Ticona under the tradename TOPAS, by Nippon Zeon under the tradename ZEONEX and ZEONOR, by Daikyo Gomu Seiko under the tradename CZ resin, and by Mitsui Petrochemical Company under the tradename APEL.

Suitable comonomers include α-olefins having from 3–10 carbons, aromatic hydrocarbons, other cyclic olefins and bridged polycyclic hydrocarbons.

It may also be desirable to have pendant groups associated with the cyclic olefin containing polymers and bridged polycyclic containing hyrdrocarbons. The pendant groups are for compatibilizing the cyclic olefin containing polymers and the bridged polycyclic hydrocarbon containing polymers with more polar polymers including amine, amide, imide, ester, carboxylic acid and other polar functional groups. Suitable pendant groups include aromatic hydrocarbons, carbon dioxide, monoethylenically unsaturated hydrocarbons, acrylonitriles, vinyl ethers, vinyl esters, vinylamides, vinyl ketones, vinyl halides, epoxides, cyclic esters and cyclic ethers. The monethylencially unsaturated hydrocarbons include alkyl acrylates, and aryl acrylates. The cyclic ester includes maleic anhydride.

The port tube and the membrane tube are preferably fabricated using coextrusion techniques well known to those skilled in the polymer fabrication art. The membrane tube is preferably bonded to the port tube by dipping the membrane tube in a suitable solvent such as an aromatic solvent including cyclohexanone, toluene, tetrahydofuran, cumene, xylenes, diethyl benzene, tetralin, decalin and amyl benzene to name a few.

EXAMPLES

Membrane tubes and port tubes were coextruded having the layered structures set forth in the table below. The membrane tubes were dipped in cyclohexanone and were inserted into the membrane tubes in a telescoping fashion to form a closure assembly. The closure assemblies were tested for bond strength, spike insertion force and spike removal force.

The bonding strength was tested by gripping the port tube at one end of an Instron tester and the membrane tube in the other end and operating the Instron at a cross head speed of 10 in./min.

A two layered port tube having an outer and an inner layer was coextruded. The inner layer had a thickness of 0.006 inches and was fabricated from SEBS. The outer layer had a thickness of 0.026 inches and was fabricated from a polymer blend by weight of the outer layer of 35% polypropylene/5% ultra low density polyethylene/30% dimer fatty acid polyamide/30% SEBS with maleic anhydride functionality.

A three layered membrane tube was coextruded having an inner layer, a core layer and an outer layer. The inner layer is a polymer blend by weight 30% polypropylene/35% dimer fatty acid polyamide/35% SEBS. The core layer was a blend of 85% SEBS and 15% polypropylene. The outer layer was 45% SEBS and 55% polypropylene. The inner layer had a thickness of 0.003 inches, the core layer 0.023 inches and the outer layer 0,006 inches.

Polymeric sheeting was extruded from a blend by weight of 10% dimer fatty acid polyamide, 35% ultra low density polyethylene, 45%polypropylene and 10% SEBS with maleic anhydride functionality.

Two rectangularly-shaped sheets of the polymeric sheeting were placed into registration and sealed along 3 peripheral edges to define a pouch. A port tube segment was inserted into an open end of the pouch and was heat sealed therein while sealing the final peripheral edge to define a container. A membrane tube segment was dipped into cyclohexanone and inserted in a telescoping fashion into the port tube segment.

The container was bolted down proximate a mechanical tester. The port tube was attached to a spike attached to a cross-head of the mechanical tester. The cross-head speed of the tester was set at 20 in/min. The cross-head was set to achieve the desired spike insertion depth in the port tube. The tester allowed for measuring the spike insertion force and the spike removal force. The average spike insertion value after 50 tests was 13.31 lbf. The average spike removal force for 50 tests was 10.37 lbf. These measurements were made after the spike dwelled in the membrane tube for 24 hours.

The tester was also used to determine the pull force necessary to remove the port tube from the container or to otherwise damage the container or port tube. The port tube was inserted into the tester with the container bolted down. The average pull force for 28 tests was 30.04 lbf. This test was conducted prior to steam sterilizing the container. The value for 30 test after the container was steam sterilized was 42.68 lbf.

The components of individual tubing layers are designated as follows in Table 1:

The tubings layers are specified from outside layer, intermediate layer and inside layer.

The results of these tests are reported in Table 1 below.

| Port tube | Membrane Tube | Bond strength | Spike Insertion | Spike removal |
|---|---|---|---|---|
| I/II | II/IV/I | 25–30 | 24 | 19 |
| I/III | III/IV/I | 50–55 | 25   30 | 12 |

I = a blend by weight of the following components: of 40% polypropylene, 40% by weight ULDPE, 10% dimer fatty acid polyamide and 10% SEBS.
II = a blend by weight of the following four components: 38% polyester polyether block copolymer (Hytrel), 2% polypropylene, 10% EVA and 50% SEBS.
III = a blend by weight of the following five components: 27% polyester polyether block copolymer, 1% polypropylene, 7% EVA, 35% SEBS and 30% ABS.
IV = Shell Kraton KG 2705
V = a blend by weight of the following components: 45% polypropylene, 35% ULDPE, 10% dimer fatty acid polyamide and 10% SEBS.

We claim:

1. A multiple layered non-PVC containing tubing structure comprising:

a first layer of a polymer blend of: (a) from about 30% to about 50% by weight of the first layer a first polyolefin selected from the group consisting of a first propylene containing polymer, (b) an amount from about 0% to about 50% by weight of the first layer a second polyolefin of an α-olefin containing polymer; (c) an amount from about 0% to about 40% by weight of the first layer of a radio frequency susceptible polymer selected from the group consisting of polyamides, ethylene acrylic acid copolymers, ethylene methacrylic acid copolymers, polyimides, polyurethanes, polyesters, polyureas, ethylene vinyl acetate copolymers with a vinyl acetate comonomer content from 18–50% by weight of the copolymer, ethylene methyl acrylate copolymers with methyl acrylate comonomer content from 18%–40% by weight of the copolymer, ethylene vinyl alcohol with vinyl alcohol comonomer content from 15%–70% by mole percent of the copolymer; and (d) an amount from about 0% to about 40% of a first thermoplastic elastomer; and a second layer of a non-PVC containing material of a multiple component polymer blend of from about 25% to about 55% by weight of a second thermoplastic elastomer, from about 20% to about 45% of a polyester polyether block copolymer, an amount from about 0% to about 15% ethylene copolymerized with vinyl lower alkyl esters, from about 0% to about 10% of a second propylene containing polymer and from about 0% to about 35% of a component selected from the group consisting of acrylonitrile butadiene styrene block copolymers, styrene ethylene butene copolymers, styrene acrylonitrile copolymers, cyclic olefin containing polymers and bridged polycylic olefin containing polymers.

2. The tubing of claim 1 wherein the second layer is coaxially mounted within the first layer.

3. The tubing of claim 1 wherein the first layer is coaxially mounted within the second layer.

4. The tubing of claim 1 wherein the polyamide is selected from a group consisting of: aliphatic polyamides resulting from the condensation reaction of di-amines having a carbon number within a range of 2–13, aliphatic polyamides resulting from a condensation reaction of di-acids having a carbon number within a range of 2–13, ring opening reaction of cyclic amides, polyamides resulting from the condensation reaction of dimer fatty acids, and amide containing copolymers.

5. The tubing of claim 1 wherein the polyamide is a dimer fatty acid polyamide.

6. The tubing of claim 1 wherein the first polyolefin is a homopolymer of propylene, or propylene copolymerized with a monomer selected from the group consisting of α-olefins having from 2–17 carbons.

7. The tubing of claim 6 wherein the first polyolefin is a propylene and ethylene copolymer having an ethylene content of from about 1% to about 8% by weight of the copolymer.

8. The tubing of claim 1 wherein the first thermoplastic elastomer is a first styrene and hydrocarbon copolymer.

9. The tubing of claim 8 wherein the first styrene and hydrocarbon copolymer is selected from the group consisting of styrene and hydrocarbon diblock copolymers, styrene and hydrocarbon triblock copolymers, and styrene and hydrocarbon star block copolymers.

10. The tubing of claim 9 wherein the first thermoplastic elastomer is a styrene-ethylene-butene-styrene block copolymer.

11. The tubing of claim 9 wherein the first thermoplastic elastomer is functionalized with a group selected from the group consisting of carboxylic acid, esters of carboxylic acids, anhydrides of carboxylic acids, epoxides, and carbon monoxide.

12. The tubing of claim 11 wherein the first thermoplastic elastomer is maleic anhydride functionalized.

13. The tubing of claim 1 wherein the second thermoplastic elastomer is a styrene and hydrocarbon copolymer.

14. The tubing of claim 13 wherein the second styrene and hydrocarbon copolymer is selected from the group consisting of styrene and hydrocarbon diblock copolymers, styrene and hydrocarbon triblock copolymers, styrene and hydrocarbon star block copolymers and blends of the same.

15. The tubing of claim 14 wherein the second thermoplastic elastomer is a styrene-ethylene-butene-styrene block copolymer.

16. The tubing of claim 1 wherein the second polyolefin is an α-olefin copolymerized with an ethylene monomer.

17. The tubing of claim 16 wherein the second polyolefin is an ethylene and α-olefin copolymer.

18. The tubing of claim 17 wherein the ethylene and α-olefin copolymer is obtained using a single site catalyst.

19. The tubing of claim 1 wherein the vinyl lower alkyl esters is selected from the group consisting of vinyl methanoate, vinyl acetate, vinyl propionate, and vinyl butyrate.

20. The tubing of claim 19 wherein the vinyl lower alkyl ester is vinyl acetate.

21. The tubing of claim 20 wherein the ethylene and vinyl lower alkyl ester is an ethylene and vinyl acetate copolymer having a vinyl acetate content from about 12% to about 32% by weight of the copolymer.

22. The tubing of claim 1 wherein the second propylene containing polymer is propylene copolymerized with a monomer selected from the group consisting of α-olefins having from 2–17 carbons.

23. The tubing of claim 22 wherein the second propylene containing polymer is a propylene and ethylene copolymer having an ethylene content of from about 1% to about 8% by weight of the copolymer.

24. The tubing of claim 1 wherein the first layer has by weight of the first layer: (a) from about 30% to about 40% of the first polyolefin, (b) an amount from about 0% to about 50% of the second polyolefin; (c) an amount from about 0% to about 40% of the radio frequency susceptible polymer and (d) an amount from about 0% to about 40% of the first thermoplastic elastomer; and the second layer has by weight of the second layer from about 25% to about 55% by weight of the second themoplastic elastomer from about 20% to about 45% of the polyester polyether block copolymer, an amount from about 0% to about 15% of the ethylene copolymerized with vinyl lower alkyl esters, an amount from about 0% to about 10% of the second propylene containing polymer and an amount from about 0% to about 35% of the group of acrylonitrile butadiene styrene block copolymer, styrene ethylene butene copolymers, polymethyl methacrylite copolymers, polyester homopolymers, polyester copolymers, styrene acrylonitrile copolymers, cyclic olefin containing polymers and bridged polycylic olefin containing polymers.

25. The tubing of claim 24 wherein the second layer has by weight of the second layer from about 33% to about 35% of the second thermoplastic elastomer, from about 25% to about 29% of the polyester polyether block copolymer, from about 5% to about 9% ethylene copolymerized with vinyl lower alkyl esters, from about 1% to about 3% of a second propylene containing polymer and from about 28% to about 32% acrylonitrile butadiene styrene block copolymer.

26. The tubing of claim 25 wherein the second layer has by weight of the second layer from about 48% to about 52% of the second thermoplastic elastomer, from about 36% to about 42% of the polyester polyether block copolymer, from about 8% to about 12% ethylene copolymerized with vinyl lower alkyl esters, and from about 1% to about 4% of the second propylene containing polymer.

* * * * *